United States Patent [19]

Lowry

[11] 4,022,397
[45] May 10, 1977

[54] 8-TRACK CARTRIDGE

[75] Inventor: Alan Lowry, Canton, Mass.

[73] Assignee: Data Packaging Corporation, Cambridge, Mass.

[22] Filed: Aug. 18, 1975

[21] Appl. No.: 605,532

[52] U.S. Cl. .................................. 242/55.19 A
[51] Int. Cl.$^2$ .................. G11B 23/10; B65H 17/48
[58] Field of Search ............ 242/55.19 A, 55.19 R; 360/93

[56] References Cited
UNITED STATES PATENTS

| 2,778,880 | 1/1957 | Eash | 242/55.19 A |
| 2,864,611 | 12/1958 | Gray | 242/55.19 A |
| 3,326,484 | 6/1967 | Yefsky | 242/55.19 A |
| 3,443,767 | 5/1969 | Liddle et al. | 242/55.19 A |

Primary Examiner—George F. Mautz
Attorney, Agent, or Firm—Wolf, Greenfield & Sacks

[57] ABSTRACT

An endless tape cartridge having a base and cover includes a reel on the base on which a tape pack is coiled. The reel includes a flange and a hub, and the hub has an upper cylindrical portion which overhangs the tape wound on the reel. A flexible member carried by the cover extends from the periphery of the pack of tape under the overhang to prevent the tape on the reel from riding up on and coning about the upper cylindrical portion of the hub.

10 Claims, 8 Drawing Figures

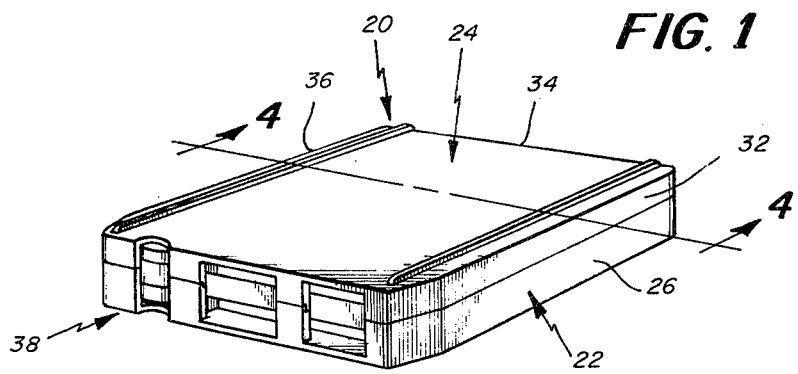
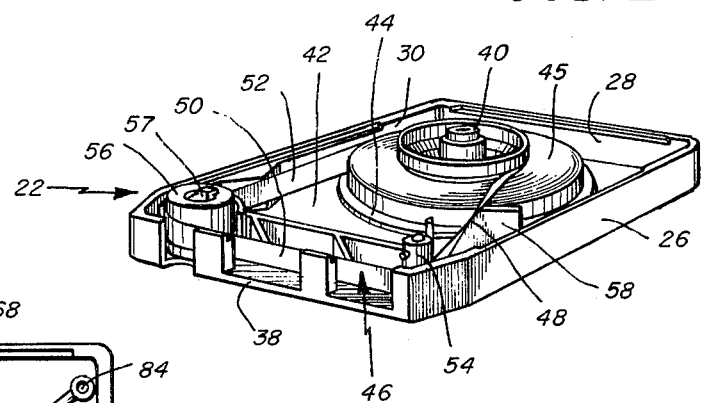
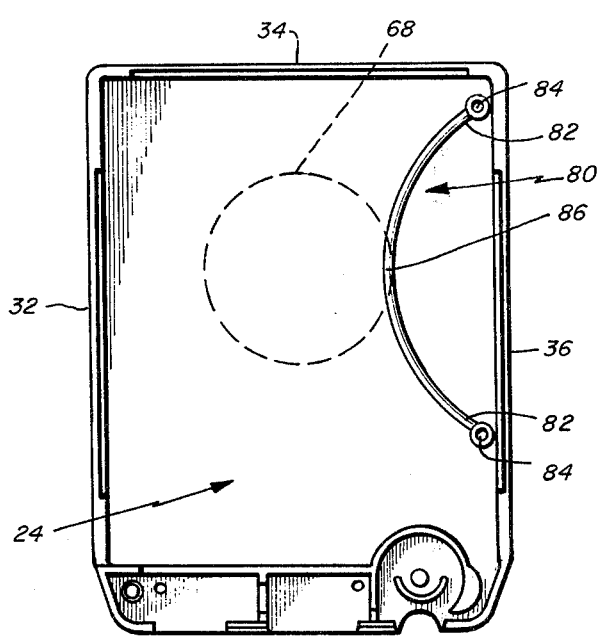
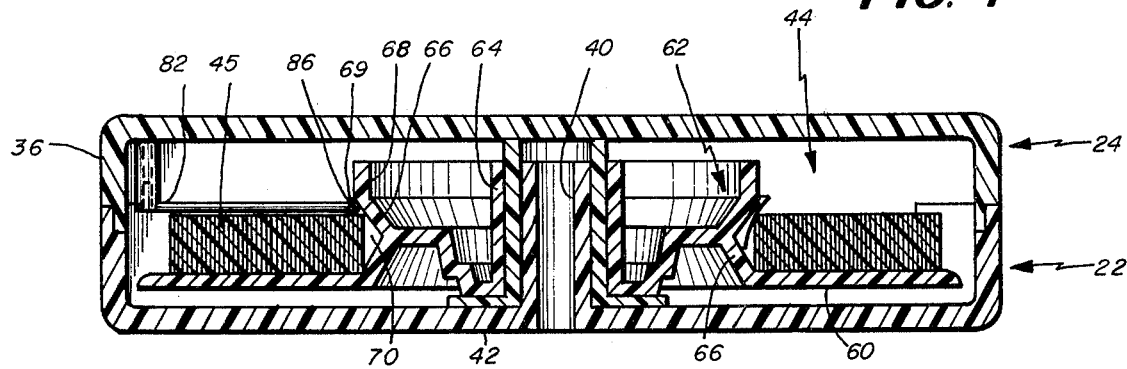

4,022,397

8-TRACK CARTRIDGE

INTRODUCTION AND BACKGROUND

This invention relates to endless tape cartridges and more particularly comprises a new and improved cartridge having an effective and inexpensive means for retaining the tape on the reel.

Endless tape cartridges are generally composed of a base, cover, reel and tape pack which comprise a small, easy to handle package. The endless tape is wound on the reel and is played out in the form of a loop from the inner convolution about guides at the front and returns to the reel at the outer convolution. In the prior art, a variety of different techniques have been employed to deal with excess tape in the loop which is played out of the pack due to mishandling of the cartridge. For example, in the prior art, special storage chambers have been designed in the cover and/or base to temporarily store excess tape in the loop so that it does not become jammed. One popular design calls for a storage chamber about the hub of the reel where the excess tape may collect. Another manner of dealing with this problem has been the provision of braking means in the cartridge which prevents rotation of the reel except when the cartridge is properly mounted on the player or recorder with which it is used.

All of the prior art arrangements have limitations. For example, those cartridges which provide a storage chamber about the hub of the reel for excess tape essentially encourage the inner convolutions of tape on the reel to ride up on the hub during use and to cone on the hub when the cartridge is inverted. The braking devices used to prevent rotation of the reel except when the cartridge is properly mounted on the player or recorder require special attachments in the recorders and players to release the braking device when in use. Unless such a system is universally adopted, cartridges with braking devices could not be used except on certain prescribed machines. Obviously, such a situation would not be tolerable.

Another technique for dealing with excess tape in the loop is the use of an annular wafer which is dropped on top of the tape pack on the reel about the hub. While these wafers perform satisfactorily, they require special threading of the tape through the center in the middle of the wafer, which adds significantly to the assemblying costs in manufacture.

Yet another technique for dealing with excessively long tape loops is the provision of a flange on the cover which extends downwardly on the side of the hub in very close proximity thereto. In order to work effectively, the flange must lie within a mil or two of the hub surface, which imposes very stringent manufacturing tolerances on all of the parts.

An important object of this invention is to provide a simple and inexpensive means for preventing inner convolutions of tape from riding up on the hub of the reel during use and from coning about the reel when the cartridge is inverted. A further object of this invention is to provide such a device which does not impose special assemblying techniques during manufacture. And another object of this invention is to provide such a device which does not require special cooperative features in the players and recorders with which the cartridge is used.

To accomplish these and other objects, the cartridge of this invention includes a flexible member which is carried by the cover and which automatically moves into place when the cover is assembled on the base. The member extends from beyond the periphery of the reel over the tape pack to a position where it engages the overhang of the top of the hub.

These and other objects and features of this invention will be better understood and appreciated from the following detailed description of several embodiments thereof, selected for purposes of illustration and shown in the accompanying drawing.

BRIEF FIGURE DESCRIPTION

FIG. 1 is a perspective view of a magnetic tape cartridge constructed in accordance with this invention.

FIG. 2 is a perspective view of the base of the cartridge shown in FIG. 1.

FIG. 3 is a bottom plan view of the cover of the cartridge shown in FIG. 1.

FIG. 4 is a cross sectional view of the cartridge taken along a section suggested by the section line 4—4 of FIG. 1.

Figure 5:
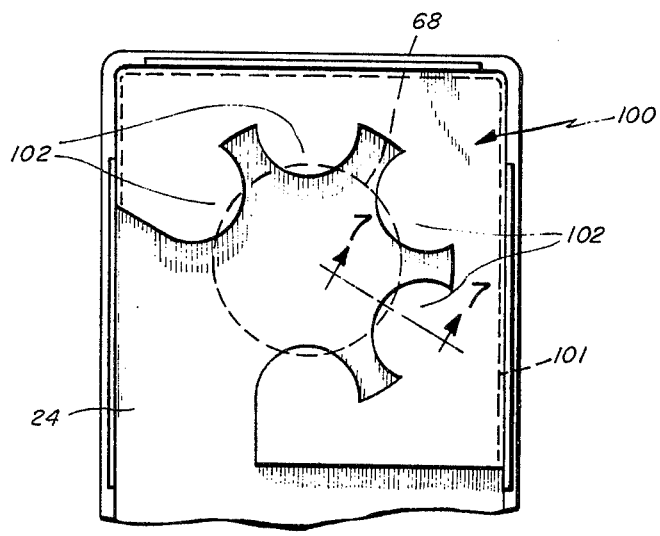
FIGS. 5 and 6 are views similar to FIG. 3 showing other embodiments of this invention.
Figure 6:
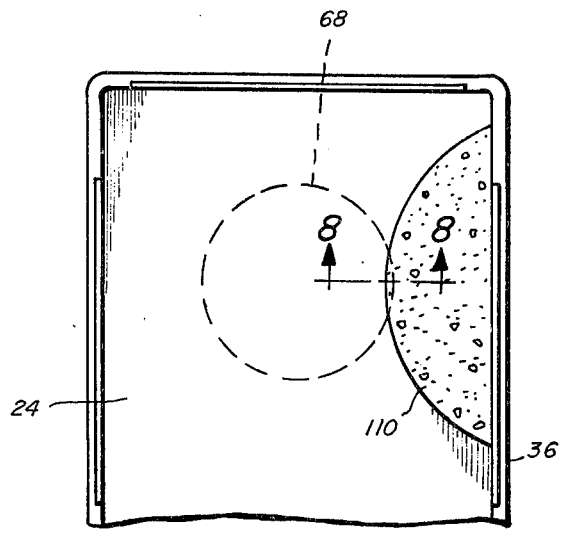
Figure 7:
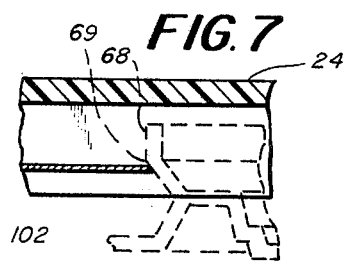
Figure 8:
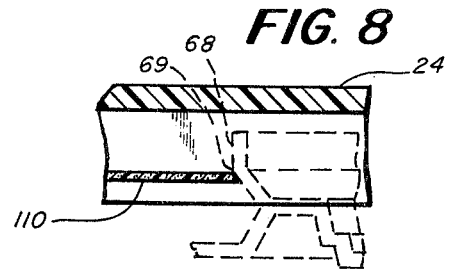

FIGS. 7 and 8 are fragmentary cross sectional views of the cartridges taken along sections suggested by section lines 7—7 and 8—8 of FIGS. 5 and 6, respectively.

DETAILED DESCRIPTION

The magnetic tape cartridge of the present invention is popularly known as an 8-track cartridge and comprises a case 20 having a base 22 and cover 24. The sides and rear of case 20 are closed by peripheral walls 26, 28, and 30 on the base and corresponding walls 32, 34 and 36 on the cover. The front 38 of the case is open to proved access to the interior of the case for the player and/or recorder head as well as the drive capstan which advances the tape, of the instrument on which the cartridge is used.

A sleeve 40 is mounted near the center of the case on the bottom wall 42 of the base and serves as a spindle for reel 44 which carries the tape. The tape 45 wound on reel 44 is in the form of an endless coil which feeds out from the inner convolution of tape wound on the reel and winds back on the reel as the outer convolution. As shown in FIG. 2, the tape played out from the center of the reel and returned as the outer convolution forms a loop 46 having one leg 48 that extends to the forward right front corner of the case as viewed in FIG. 2, a second leg 50 which extends across the front of the case behind the open front wall 38, and a third leg 52 which returns from the front left corner to the outer convolution. A post 54 in the form of a sleeve at the front right corner of the cartridge serves as one guide for the tape loop, and roller 56 mounted on a second sleeve 57 in the front left corner serves as the other guide at the front of the cartridge. Yet another guide 58 supports the first leg 48 of the tape loop as it turns from a horizontal plane as it leaves the inner convolution of tape and assumes a vertical configuration as it rounds the guide 54.

The reel 44 mounted on spindle 40, which supports the coiled tape is shown in detail in FIG. 4. The reel includes a horizontal platform or flange 60 and a hub 62 about which the tape coil 44 is wound. Hub 62 and flange 60 are supported by a central column 64 connected to them and which surrounds the post 40. The reel is mounted for rotation on the base as the tape is pulled from the inner convolution and rewound on the outer convolution of the tape pack.

The hub 62 is composed of a lower undercut section 66 and an upper cylindrical portion 68 which may be integrally molded as a unitary structure. The lower undercut section 66 provides a space 70 inside the inner convolution of tape below the upper section 68, which enables the tape to turn as it is drawn from the reel into the loop without being creased.

In several embodiments of the present invention shown in the drawings, different means are provided for retaining the coil of tape 45 on the flange and prevent it from riding up on the cylindrical wall 68 during use as well as from coning on the hub particularly when the case is inverted. In each embodiment, the means is carried by the cover 24 of the case and therefor does not in any way interfere with the initial winding of the tape onto the reel 44. In the embodiment of FIG. 3 the retaining means for the tape is in the form of a flexible wire 80 which is arcuate in shape with its ends 82 anchored to the cover by means of posts 84. The posts 84 are adjacent the side wall 36 of the cover, and the arcuate configuration of the wire 80 causes it to extend to the vicinity of reel hub 62. The radius of curvature of the wire 80 is such that the central portion 86 extends beneath the cylindrical portion 68 of the hub just below the lower edge 69 and actually snaps in place as the cover is mounted on the base. When the cover is closed, the central portion 86 of the wire actually engages the top of the undercut portion 66 of the hub. The engagement of the wire and hub actually prevents the tape from coning up on the cylindrical portion when the case is inverted and prevents the tape from otherwise riding up on the cylindrical wall 68. Moreover, the actual engagement of the wire and hub exerts pressure on the hub which has a braking effect so as to reduce the amount of rotation of the reel 44 during handling. That is, a permanent drag is placed on the reel which prevents it from rotating except when the tape is forcibly pulled from the inner convolution by virtue of the drive capstan (not shown) of the player or recorder as it engages the tape wound about the roller 56. Consequently, tape entanglements which may result in operational jamming of the cartridge are greatly reduced or eliminated.

The flexible character of the wire 80 is such that when the case is closed the wire will brush by the side of the upper portion of the hub and snap beneath it into undercut section 66.

In the embodiment shown in FIGS. 5 and 7 the wire 80 is replaced by a semi-rigid or flexible sheet 100. The sheet 100 is possessed of sufficient rigidity so as to be supported by the cover and exert a significant pressure against the hub for the same purposes as wire 80. The sheet 100 includes a series of radially inwardly extending fingers 102 (five in the embodiment shown) which extend just under the cylindrical portion 68 of the hub when the case is closed. The periphery of sheet 100 is secured to the cover flange 101 by cement or other means, and the sheet is interrupted at the forward right hand quadrant of the case so as not to interfere with the play out of the tape from the inner convolution. In operation, each fingers which lie in the same plane as wire 80 in the first embodiment essentially acts as wire 80 to engage the hub of the reel causing it to impose a drag on the reel rotation and prevent the tape from telescoping or otherwise riding up on the cylindrical portion of the hub.

In FIGS. 6 and 8 yet another embodiment is suggested. In accordance with this embodiment, wire 80 of FIG. 3 and sheet 100 of FIG. 5 are replaced by a foam, approximately semi-circular disc 110 carried bu cover 24 and occupying substantially the same area as wire 80. The foam sheet in the embodiment shown is cemented to the side wall 36 of the cover and extends just under the lower edge of the cylindrical portion 68 of the hub when the cover is closed on the base. In operation it functions in the same manner as the wire and sheet to prevent coning or telescoping of the tape, and in addition, provides a brake for the tape reel.

The relatively inexpensive and uncomplicated techniques used in each of the embodiments of this invention to retain the tape on the reel except when it is intentionally drawn from the reel on the capstan as the machine requires, replaces much more complicated and sophisticated techniques found in the prior art cartridges. In each embodiment of this invention the tape retaining means is readily connected to the cover by posts or flanges on the cover, and cemented or snapped in place by appropriate fasteners. And the means extends across the full tape radius to retain the pack on the reel flange. In the prior art cartridges such as shown in patent application Ser. No. 607,295, filed Jan. 5, 1967 entitled TAPE CARTRIDGE and assigned to the assignee of this application, storage chambers are provided about the hub of the reel to accomodate excess tape which is drawn into the loop. In addition, the chambers receive the telescoped or coned portions of the tape at the inner convolution to prevent entanglements. Those expedients add considerably to the cost of molds used to manufacture the cartridges and do not insure against tangled tape.

Those skilled in the art will appreciate that modifications may be made of this invention without departing from its spirit. Therefore, it is not intended that the breadth of this invention be limited to the specific embodiments illustrated and described. Rather, it is intended that the scope of this invention be determined by the appended claims and their equivalents.

What is claimed is:

1. An endless tape cartridge comprising
a base and a cover,
peripheral walls attached to the cover and base for enclosing the sides and rear of the cartridge and providing an open front edge.
a spindle in the base and a reel mounted on the spindle, said reel having a flange and an upwardly extending hub that surrounds the spindle,
an endless tape pack wound about the hub and having a tape loop extending between the inner and outer convolution of tape wound on the reel,
guides at the front edge of the cartridge for supporting the tape loop in a prescribed course,
said hub including an upper cylindrical portion and a lower portion of reduced diameter with the bottom of the upper cylindrical portion being spaced above the flange a distance exceeding the width of tape wound on the reel to create an overhang above the tape,
and a flexible member carried by the cover and estending from radially beyond the periphery of the tape pack on the reel, inwardly to a position beneath and inwardly of the overhang for preventing the inner convolutions of tape from riding up on and coning about the upper cylindrical portion of the hub, said member overlying the tape pack and without any of the loop overlying the member so that the cover may be assembled on the base with the member on it without the need for threading the tape over the member.

2. A tape cartridge as described in claim 1 further characterized by
said member being supported on the cover in a plane substantially parallel to and closely spaced with respect to the tape pack, the portion of the member lying beneath the overhang of the cylindrical portion snapping past the cylindrical portion when the base and cover are closed.

3. A tape cartridge as described in claim 2 further characterized by
said member being in the form of a flexible wire having at least one end anchored to the cover in the vicinity of a side wall and extending inwardly over the reel pack and beneath the overhang.

4. A tape cartridge as described in claim 3 further characterized by
said wire having both ends anchored to the cover in the vicinity of the side wall and forming a loop with its mid portion under the overhang.

5. A tape cartridge as described in claim 2 further characterized by
said member being a sheet of flexible material having sufficient stiffness to be self-supporting, said sheet being anchored to the cover in close proximity to a peripheral wall and having at least one finger-like projection that extends under the overhang.

6. A tape cartridge as described in claim 2 further characterized by
said member being a foam rubber-like pad that is secured to the cover and extends over the tape pack to the overhang.

7. A tape cartridge as described in claim 2 further characterized by
said member being interrupted in the section of the cover which overlies the portion of the tape loop extending from the inner convolution to the front of the cartridge.

8. An endless tape cartridge comprising a base and a cover,
peripheral walls attached to the cover and base for enclosing the sides and rear of the cartridge and providing an open front edge,
a spindle in the base and a reel for carrying an endless tape pack mounted on the spindle, said reel having a flange and an upwardly extending hub that surrounds the spindle,
said hub including an upper cylindrical portion and a lower portion of reduced diameter with the bottom of the upper cylindrical portion being spaced above the flange a distance exceeding the height of the tape pack adapted to be wound on the reel to create an overhang above the tape,
and a flexible member carried by the cover and extending inwardly to a position beneath and inwardly of the overhang for preventing the inner convolutions of tape in the pack from riding up on and coning about the upper cylindrical portion of the hub, said member overlying the tape pack and without any of the loop overlying the member so that the cover may be assembled on the base with the member on it without the need for threading the tape over the member.

9. An endless tape cartridge comprising
a base and a cover,
peripheral walls attached to the cover and base for enclosing the sides and rear of the cartridge,
a spindle in the base and a reel mounted on the spindle, said reel having a flange and an upwardly extending hub that surrounds the spindle,
an endless tape pack wound about the hub and having a tape loop extending between the inner and outer convolution of tape wound on the reel,
guides at the front of the cartridge for supporting the tape loop in a prescribed course,
said hub including an upper portion which extends above the top of the inner convolutions of the tape pack,
and a flexible member carried by the cover and extending from radially beyond the periphery of the tape pack on the reel to the upper portion of the hub for preventing the inner convolutions of tape from riding up on and coning about the upper portion of the hub, said member overlying the tape pack and without any of the loop overlying the member so that the cover may be assembled on the base with the member on it without the need for threading the tape over the member.

10. An endless tape cartridge as described in claim 9 further characterized by
said member being in the form of a flexible wire having both ends anchored to the cover and forming a loop with its midportion engaging the upper portion of the hub.

* * * * *